Patented Mar. 10, 1925.

1,528,991

UNITED STATES PATENT OFFICE.

STANLEY FRANCIS ROGERS, OF HOUSTON, TEXAS.

POLISH.

No Drawing.   Application filed May 29, 1924. Serial No. 716,827.

*To all whom it may concern:*

Be it known that I, STANLEY FRANCIS ROGERS, a citizen of the United States, residing at Houston, in the county of Harris and State of Texas, have invented certain new and useful Improvements in Polishes, of which the following is a specification.

This invention relates to certain improvements in polishes and it is an object of the invention to provide a polish particularly adapted for use in connection with automobiles, furniture and the like and it is also an object of the invention to provide a novel and improved polish of this general character which operates effectively in renovating dead paint and to restore the original lustre.

Another object of the invention is to provide a novel and improved compound of this general character which serves effectually for spot cleaning, for removing butter spots, alkali spots and other accumulations.

A further object of the invention is to provide a novel and improved polish which serves to remove rust, and also to act as a rust preventive.

My improved compound comprises the following ingredients to the gallon in the proportions given:

| | | |
|---|---|---|
| Linseed oil | 32 | ounces. |
| Standard japan dryer | 1½ | ounces. |
| Ether | 6 | ounces. |
| Citronella | 1½ | ounces. |
| Kerosene | 26 | ounces. |
| Coloring matter | 1 | tablespoon. |
| Lubricating oil | 30 | ounces. |
| Gasoline (good grade) | 32 | ounces. |

The linseed oil serves as a renovating medium to add life to dead paint and to restore the original lustre, while the standard japan dryer serves as a dryer chiefly for the linseed oil, said two ingredients being effectively mixed one with the other.

The ether, which may be of a low grade, serves for spot cleaning such as butter spots, alkali spots and other accumulations. This motor ether also acts as a dryer.

The citronella acts as a deodorizing medium to eliminate the smell of the ether. The ether and the oil of citronella are first well mixed one with the other before being poured in with the first mentioned ingredients.

The kerosene serves to remove rust and to act as a rust preventive and also serves to thin down the heavier fluids.

The coloring matter as employed may be as preferred it only being essential that it be free of acids.

The lubricating oil serves for dusting, for lustre and to add life to the paints and also to provide a base for the polish. This oil is preferably medium heavy.

The gasoline also serves to thin down the heavier fluids assuring the proper admixture of all the ingredients.

The polish is preferably sold in bottles and before such bottles or other containers are filled the complete mixture is effectively stirred.

I claim:—

A polish of the class described comprising an admixture of linseed oil, 32 ounces, dryer, 1½ ounces, ether, 6 ounces, a deodorant, 1½ ounces, kerosene, 26 ounces, lubricating oil, 30 ounces, gasoline, 32 ounces.

In testimony whereof I hereunto affix my signature.

STANLEY FRANCIS ROGERS.